US009373094B2

(12) United States Patent
Chalana et al.

(10) Patent No.: US 9,373,094 B2
(45) Date of Patent: *Jun. 21, 2016

(54) DYNAMIC WEB SERVICES SYSTEM AND METHOD

(71) Applicant: Winshuttle, LLC, Bothell, WA (US)

(72) Inventors: Vishal Chalana, Panchkula (IN); Amit Sharma, Chandigarh (IN); Piyush Nagar, Chandigarh (IN); Vishal Sharma, Meerut (IN); Vikram Chalana, Bothell, WA (US)

(73) Assignee: Winshuttle, LLC, Bothell, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,218

(22) Filed: Feb. 17, 2014

(65) Prior Publication Data

US 2014/0164497 A1    Jun. 12, 2014

Related U.S. Application Data

(63) Continuation of application No. 13/666,344, filed on Nov. 1, 2012, now Pat. No. 8,516,554, which is a continuation of application No. 13/016,704, filed on Jan. 28, 2011, now Pat. No. 8,701,159.

(60) Provisional application No. 61/334,099, filed on May 12, 2010.

(51) Int. Cl.
*G06Q 10/06* (2012.01)
*G06F 9/54* (2006.01)
*H04L 12/911* (2013.01)

(52) U.S. Cl.
CPC ............... *G06Q 10/06* (2013.01); *G06F 9/541* (2013.01); *H04L 47/748* (2013.01)

(58) Field of Classification Search
CPC ...... G06Q 10/06; H04L 47/748; G06F 9/541; G06F 7/04; G06F 15/16
USPC .......... 726/3; 717/106; 707/71, 710; 709/203
See application file for complete search history.

(56) References Cited

U.S. PATENT DOCUMENTS

| | | | |
|---|---|---|---|
| 8,397,128 B1 * | 3/2013 | Alonzo et al. ................ | 714/759 |
| 2003/0084350 A1 * | 5/2003 | Eibach et al. ................ | 713/201 |
| 2004/0068586 A1 * | 4/2004 | Xie et al. ....................... | 709/246 |
| 2004/0073661 A1 * | 4/2004 | Eibach et al. ................ | 709/224 |
| 2007/0255717 A1 * | 11/2007 | Baikov et al. .................. | 707/10 |
| 2008/0209348 A1 * | 8/2008 | Grechanik et al. ........... | 715/762 |
| 2011/0083117 A1 * | 4/2011 | Vitanov et al. ................ | 717/106 |

OTHER PUBLICATIONS

Winshuttle: Best Practices for automatiing SAP Order-to-Cash, Published 2007; Downloaded Winshuttle.com 1-45.*

* cited by examiner

*Primary Examiner* — Harunur Rashid
(74) *Attorney, Agent, or Firm* — Aeon Law; Adam L. K. Philipp

(57) ABSTRACT

A Dynamic Web Service server may facilitate custom Enterprise Application interface development with little or no developer input by dynamically creating a web service for performing a particular transaction according to a transaction map. An Enterprise Application client device may create a transaction map by "recording" a transaction between an Enterprise Application client and an Enterprise Application server and mapping transaction fields to a custom interface generated to collect data for re-performing the recorded transaction. The Enterprise Application client device may call the dynamic web service, and the Dynamic Web Service server may then perform the recorded transaction using input data collected in the custom interface.

24 Claims, 14 Drawing Sheets

```
                                                                    800
                                                                   /
┌─────────────────────────────────────────────────────────────────────┐
│ ⊗⊗ ▽ │ http://10.26.0.5/WinshuttleServer/Service.svc/?ChangeMaterial.Wsdl │ ▼ │ ⇄ │ ✕ │
├─────────────────────────────────────────────────────────────────────┤
│ File  Edit  View  Favorites  Tools  Help                            │
├─────────────────────────────────────────────────────────────────────┤
│ ⓔ http://10.26.0.5/WinshuttleServer/Service.svc/?C...│    801       │ Winshuttle Download Lir │
│                                                  ╲              │ http://wss-sea-ap01/dev │
├─────────────────────────────────────────────────────────────────────┤
│   <?xml version="1.0" encoding="utf-8" ?>                           │
│ - <definitions xmlns="http://schemas.xmlsoap.org/wsdl/" name="ChangeMaterial" targetNamesp: │
│     xmlns:soap="http://schemas.xmlsoap.org/wsdl/soap/" xmlns:tns="http://tempuri.org/" xm │
│     xmlns:xsd="http://www.w3.org/2001/XMLSchema" xmlns:s="http://www.w3.org/2001/XM │
│   - <wsdl:types>                                                    │
│     - <s:schema elementFormDefault="qualified" targetNamespace="http://tempuri.org/"> │
│  830    - <s:element name="Run">                                    │
│           - <s:complexType>                                         │
│              - <s:sequence>                                         │
│  805           <s:element minOccurs="1" maxOccurs="1" name="RMMG1-MATNR" type="s:string" /> │
│  810           <s:element minOccurs="1" maxOccurs="1" name="MAKT-MAKTX" type="s:string" /> │
│  815           <s:element minOccurs="1" maxOccurs="1" name="MARA-BRGEW" type="s:string" /> │
│  820           <s:element minOccurs="1" maxOccurs="1" name="MARA-GEWEI" type="s:string" /> │
│  825           <s:element minOccurs="1" maxOccurs="1" name="MARA-NTGEW" type="s:string" /> │
│              </s:sequence>                                          │
│           </s:complexType>                                          │
│         </s:element>                                                │
│  835    - <s:element name="RunResponse">                            │
│           - <s:complexType>                                         │
│              - <s:sequence>                                         │
│                 <s:element minOccurs="0" maxOccurs="1" name="RunResult" type="s:string" /> │
│              </s:sequence>                                          │
│           </s:complexType>                                          │
│         </s:element>                                                │
│       </s:schema>                                                   │
│     </wsdl:types>                                                   │
│   - <wsdl:message name="RunSoapIn">                                 │
│       <wsdl:part name="parameters" element="tns:Run" />             │
│     </wsdl:message>                                                 │
│   - <wsdl:message name="RunSoapOut">                                │
│       <wsdl:part name="parameters" element="tns:RunResponse" />     │
│     </wsdl:message>                                                 │
│   - <wsdl:portType name="ServiceSoap">                              │
│     - <wsdl:operation name="Run">                                   │
│         <wsdl:input message="tns:RunSoapIn" />                      │
│         <wsdl:output message="tns:RunSoapOut" />                    │
│       </wsdl:operation>                                             │
│     </wsdl:portType>                                                │
│   - <wsdl:binding name="ServiceSoap" type="tns:ServiceSoap">        │
│       <soap:binding style="document" transport="http://schemas.xmlsoap.org/soap/http" /> │
└─────────────────────────────────────────────────────────────────────┘
                                                          Fig. 8
```

DYNAMIC WEB SERVICES SYSTEM AND METHOD

CROSS REFERENCE TO RELATED APPLICATIONS

This application is a continuation of U.S. patent application Ser. No. 13/016,704, filed Jan. 28, 2011, titled "DYNAMIC WEB SERVICES SYSTEM AND METHOD", and naming inventors Vishal Chalana, et al. application Ser. No. 13/016,704 claims the benefit of priority to U.S. Provisional Application No. 61/334,099, filed May 12, 2010, titled "DYNAMIC WEB SERVICES SYSTEM AND METHOD," and naming inventors Vishal Chalana, et al. The above-cited applications are incorporated herein by reference in their entireties, for all purposes.

FIELD

The present invention relates to databases, and more particularly to methods of defining and providing dynamic web services for automating database transactions.

BACKGROUND

Enterprise resource planning ("ERP") systems are designed to coordinate some or all of the resources, information, and activities needed to complete business processes. An ERP system may support business functions including some or all of manufacturing, supply chain management, financials, projects, human resources, customer relationship management, and the like.

Many ERP systems provide a native application programming interface ("API") that developers may use to read, write, update, and/or remove data objects on the database level. Some ERP systems may also provide a native API that developers may use for observing, automating, and/or emulating user interactions with the ERP system, such as through a graphical user interface ("GUI"). For example, ERP Servers provided by SAP AG of Weinheim, Germany, typically expose a native API via remote function calls ("RFC"). An RFC is a procedure for data interchange (typically via a TCP/IP connection) between a client (typically an SAP client) and a server (typically an SAP server).

In addition, some ERP systems may expose some or all of a native API as a general-purpose, static "web service," which can be accessed over a network, such as the Internet, and executed on a remote system hosting the requested services. When using such a web service, clients and servers commonly communicate over the Hypertext Transfer Protocol ("HTTP") protocol.

There are several web service variants. In one variant, which has been popular with traditional enterprise, clients and servers communicate via Extensible Markup Language ("XML") messages that follow the Simple Object Access Protocol ("SOAP") standard. In such systems, there is often a machine-readable description of the operations offered by the service written in the Web Services Description Language ("WSDL").

Another web service variant conforms to Representational State Transfer ("REST") constraints and uses HTTP methods such as PUT, GET, DELETE, and POST instead of SOAP messages. RESTful web services may or may not use WSDL definitions and/or XML or JavaScript Object Notation ("JSON") messages.

Using native APIs such as those described above, it is often possible for developers to create custom forms and/or program custom clients to enable users to perform specific transactions with the ERP system. However, it can be difficult and/or expensive to have developers implement custom interfaces for interacting with an ERP system via a native-API, even an API that is exposed via a web service. Consequently, many businesses must maintain an expensive information technology department and/or use expensive outside consultants to facilitate custom ERP interface development.

BRIEF DESCRIPTION OF THE DRAWINGS

FIG. 8 illustrates a portion of an automatically-generated description of a dynamic web service corresponding to an exemplary transaction in accordance with one embodiment.

DESCRIPTION

Figure 1:
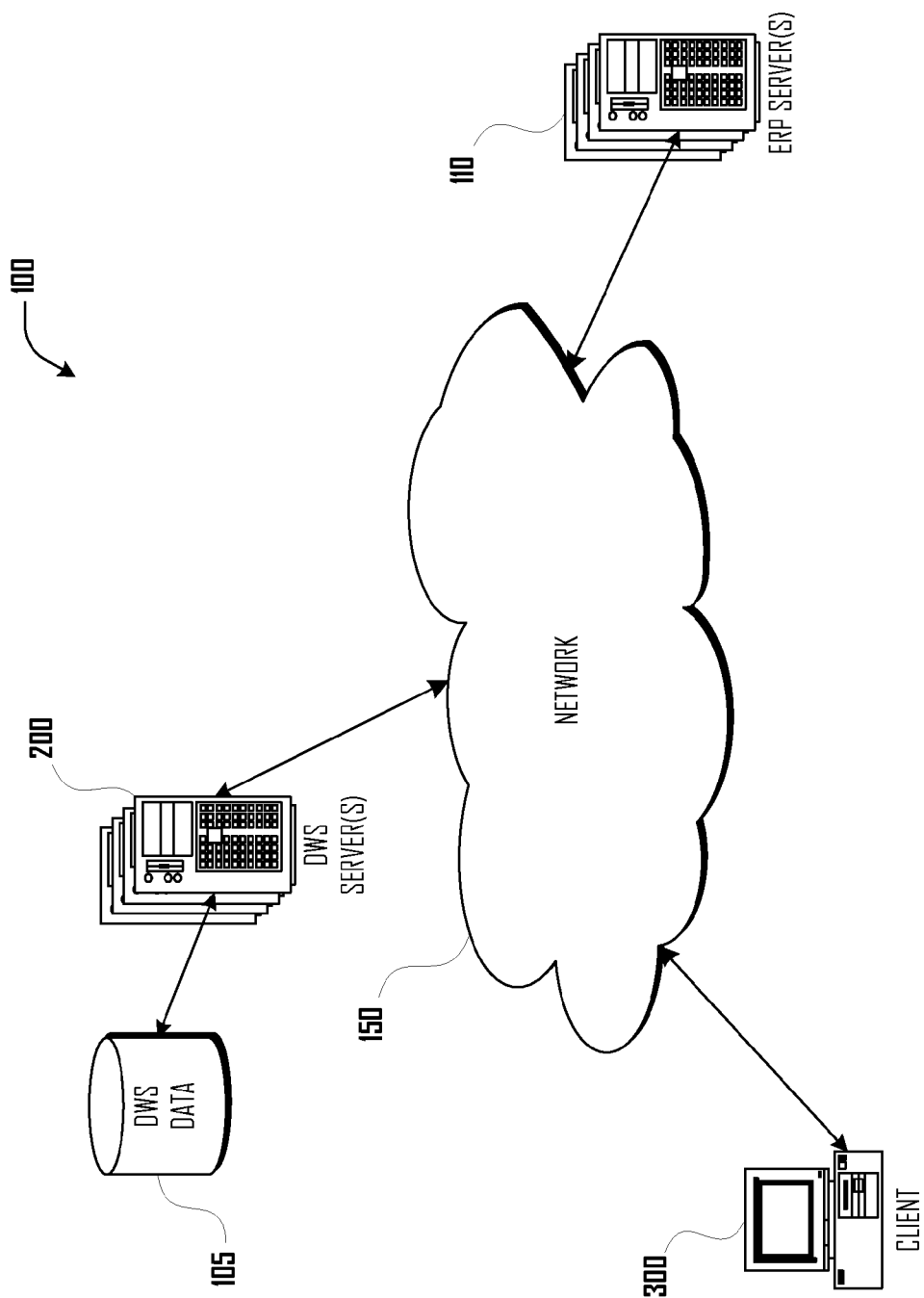
FIG. 1 illustrates an exemplary ERP system in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

According to various embodiments, as described below, a Dynamic Web Service ("DWS") server may facilitate custom Enterprise interface development with little or no developer input by dynamically creating a web service for performing a particular transaction, according to a transaction map created by "recording" a transaction between an ERP client and an ERP server.

FIG. 1 illustrates an exemplary ERP system 100 in which a client device 300, one or more DWS Server(s) 200 and one or more ERP Server(s) 110 are connected to a network 150. In some embodiments, ERP Server 110 may further comprise an application server (not shown), and/or ERP Server 110 may further include the functionality of an application server. DWS Server 200 is also connected to a DWS data store 105. In some embodiments, DWS Server 200 may communicate with DWS data store 105 via network 150, a storage area network ("SAN"), a high speed serial bus, and/or via other suitable communication technology.

In various embodiments, network 150 may include the Internet, a local area network ("LAN"), a wide area network ("WAN"), and/or other data network. In other embodiments, DWS Server 200 and ERP Server 110 may communicate with one another via a channel other than network 150. For example, DWS Server 200 and ERP Server 110 may be connected via a SAN, a high speed serial bus, and/or via other suitable communication technology. In many embodiments, there may be multiple client devices 300. In some embodiments, DWS Server 200 and ERP Server 110 may communicate with one another via a private network, a secure network, and/or a secure portion of network 150.

Figure 2:
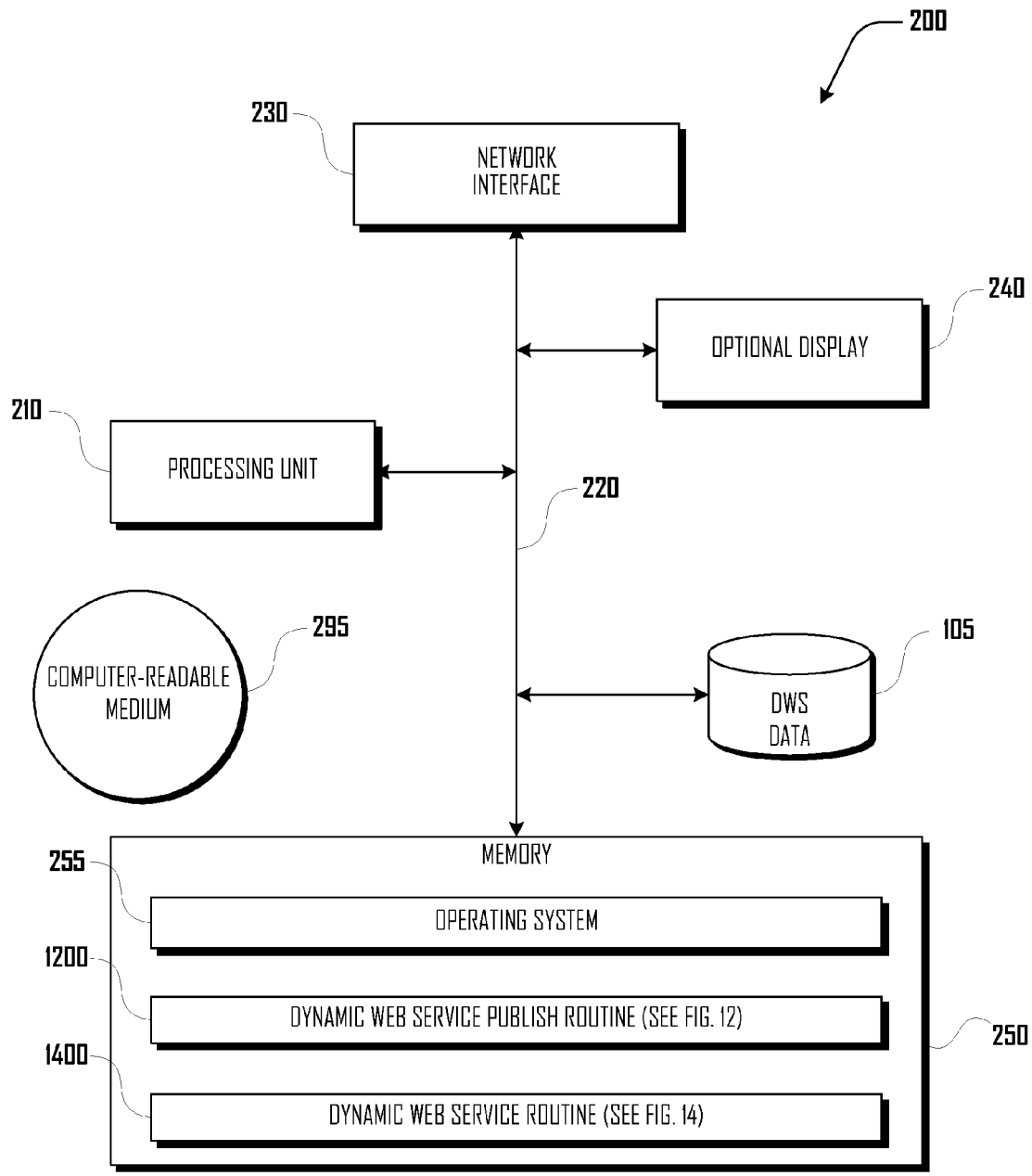
FIG. 2 illustrates several components of an exemplary DWS Server in accordance with one embodiment.

FIG. 2 illustrates several components of an exemplary DWS Server 200. In some embodiments, DWS Server 200 may include many more components than those shown in FIG. 2. However, it is not necessary that all of these generally conventional components be shown in order to disclose an illustrative embodiment. As shown in FIG. 2, the DWS Server 200 includes a network interface 230 for connecting to the network 150.

The DWS Server 200 also includes a processing unit 210, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for dynamic web service publish routine 1200 and dynamic web service routine 1400. In addition, the memory 250 also stores an operating system 255. These software components may be loaded from a computer readable storage medium 295 into memory 250 of the DWS Server 200 using a drive mechanism (not shown) associated with a computer readable storage medium 295, such as a floppy disc, tape, DVD/CD-ROM drive, memory card, or the like. In some embodiments, software components may also be loaded via the network interface 230, rather than via a computer readable storage medium 295.

DWS Server 200 also communicates via bus 220 with DWS data store 105. In various embodiments, bus 220 may comprise a storage area network ("SAN"), a high speed serial bus, and/or via other suitable communication technology. In some embodiments, DWS Server 200 may communicate with DWS data store 105 via network interface 230.

Although an exemplary DWS Server 200 has been described that generally conforms to conventional general purpose computing devices, an DWS Server 200 may be any of a great number of devices capable of communicating with the network 150 and/or ERP Server 110, for example, a personal computer, a game console, a set-top box, a handheld computer, a cell phone, or any other device that is capable of providing web services and communicating via a native-API with ERP Server 110.

Figure 3:
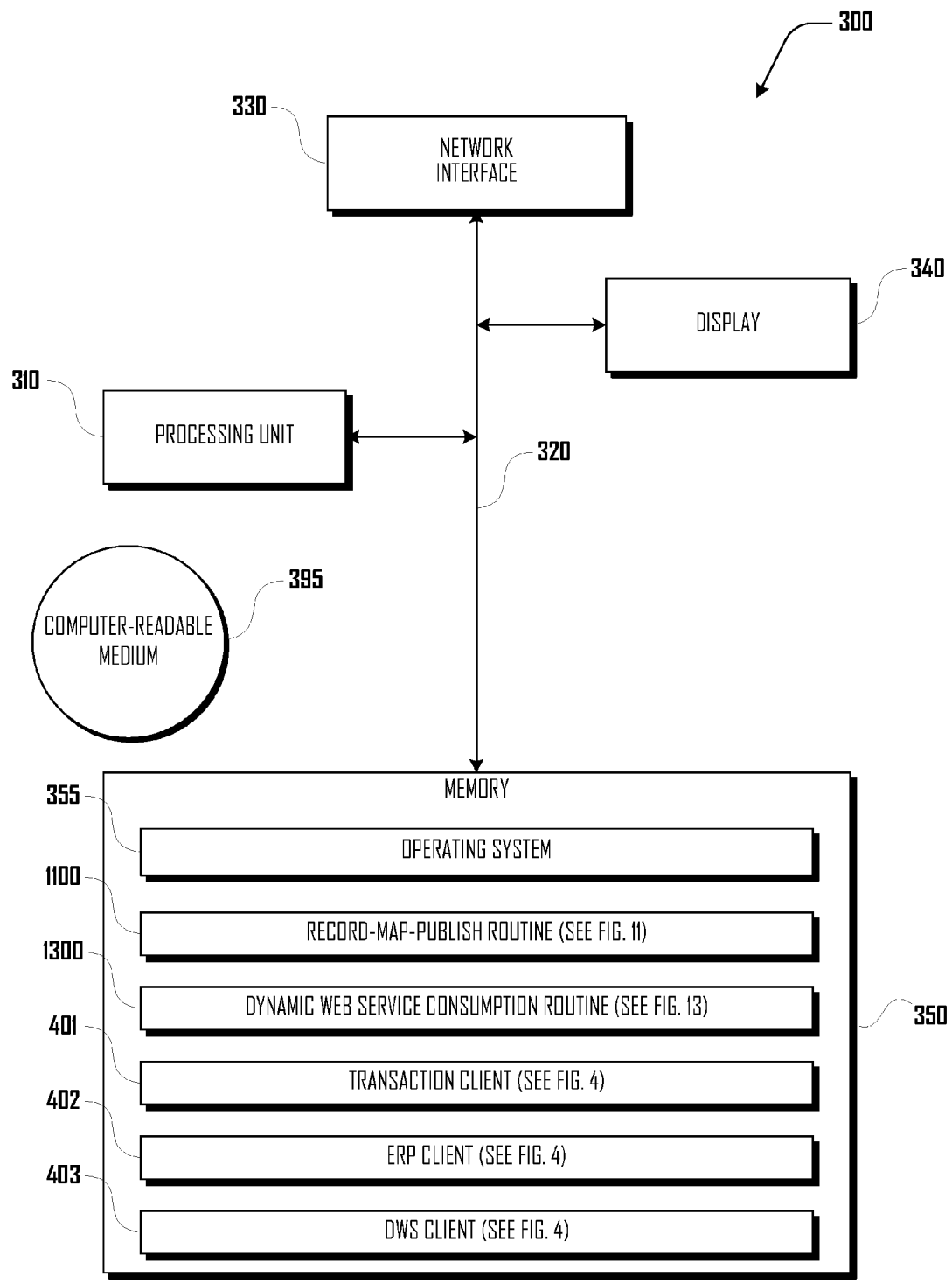
FIG. 3 illustrates several components of an exemplary Client Device in accordance with one embodiment.

FIG. 3 illustrates several components of an exemplary Client Device 300. In some embodiments, Client Device 300 may include many more components than those shown in FIG. 3. However, it is not necessary that all of these generally conventional components be shown in order to disclose an illustrative embodiment. As shown in FIG. 3, the Client Device 300 includes a network interface 330 for connecting to the network 150.

The Client Device 300 also includes a processing unit 310, a memory 350, and a display 340, all interconnected along with the network interface 330 via a bus 320. The memory 350 generally comprises a random access memory ("RAM"), a read only memory ("ROM"), and a permanent mass storage device, such as a disk drive. The memory 350 stores program code for record-map-publish routine 1100 and dynamic web service consumption routine 1300. In addition, the memory 350 also stores an operating system 355, as well as an ERP client 402, a DWS client 403, and a custom Transaction client 401 (see FIG. 4, discussed below). These software components may be loaded from a computer readable storage medium 395 into memory 350 of the Client Device 300 using a drive mechanism (not shown) associated with a computer readable storage medium 395, such as a floppy disc, tape, DVD/CD-ROM drive, memory card, or the like. In some embodiments, software components may also be loaded via the network interface 330, rather than via a computer readable storage medium 395.

Although an exemplary Client Device 300 has been described that generally conforms to conventional general purpose computing devices, an Client Device 300 may be any of a great number of devices capable of communicating with the network 150 and/or ERP Server 110, for example, a personal computer, a game console, a set-top box, a handheld computer, a cell phone, or any other device that is capable of accessing a accessing web services.

Figure 4:
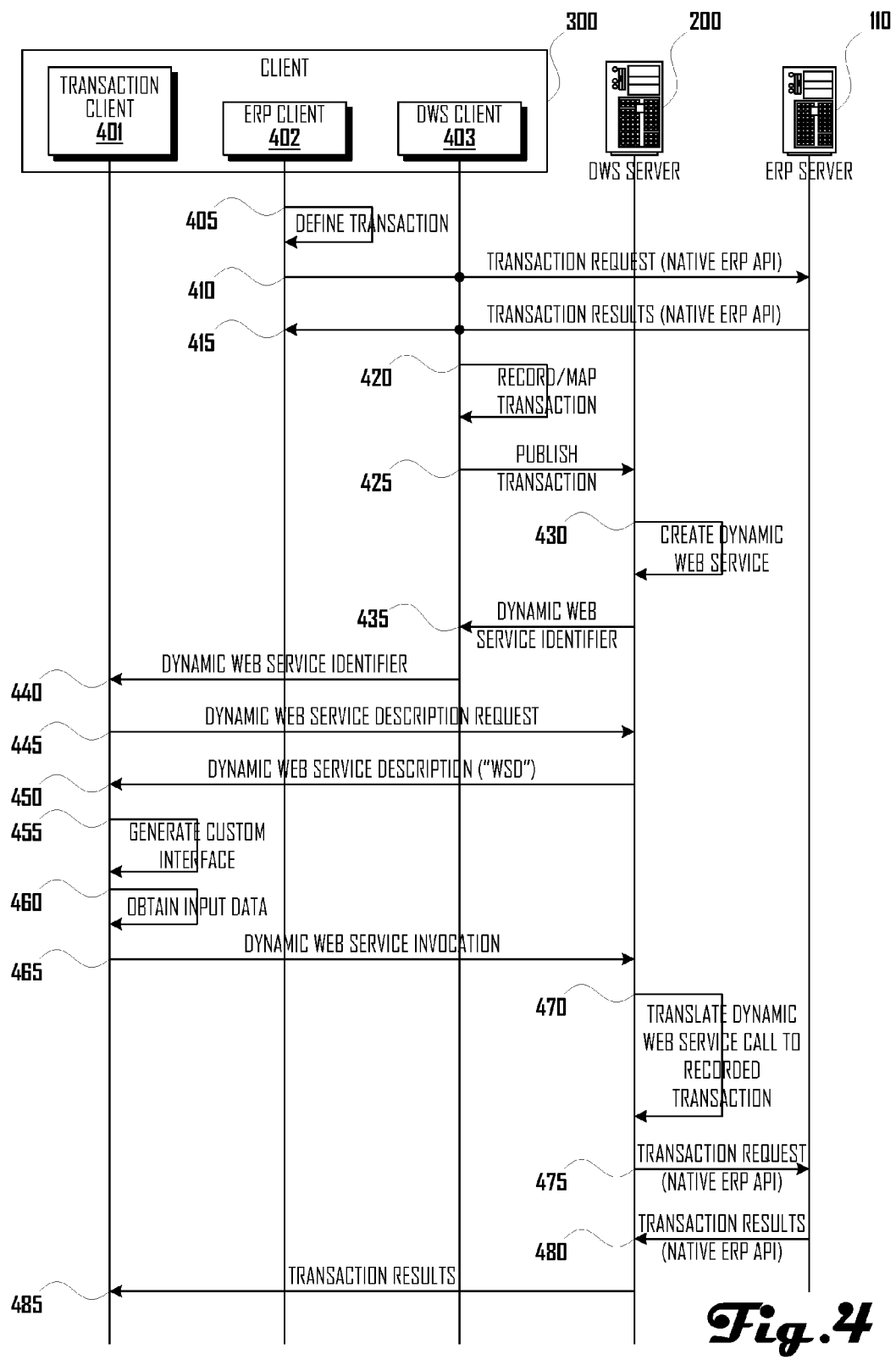
FIG. 4 illustrates an exemplary series of communications between Client, DWS Server, and ERP Server, in accordance with one embodiment.

FIG. 4 illustrates an exemplary series of communications between Client 300, DWS Server 200, and ERP Server 110, in accordance with one embodiment. In one embodiment, three software processes on Client 300 are involved: an ERP client 402, a DWS client 403, and a custom Transaction client 401. Beginning the illustrated sequence of operations, a user defines a transaction 405 using ERP client 402.

Figure 5:
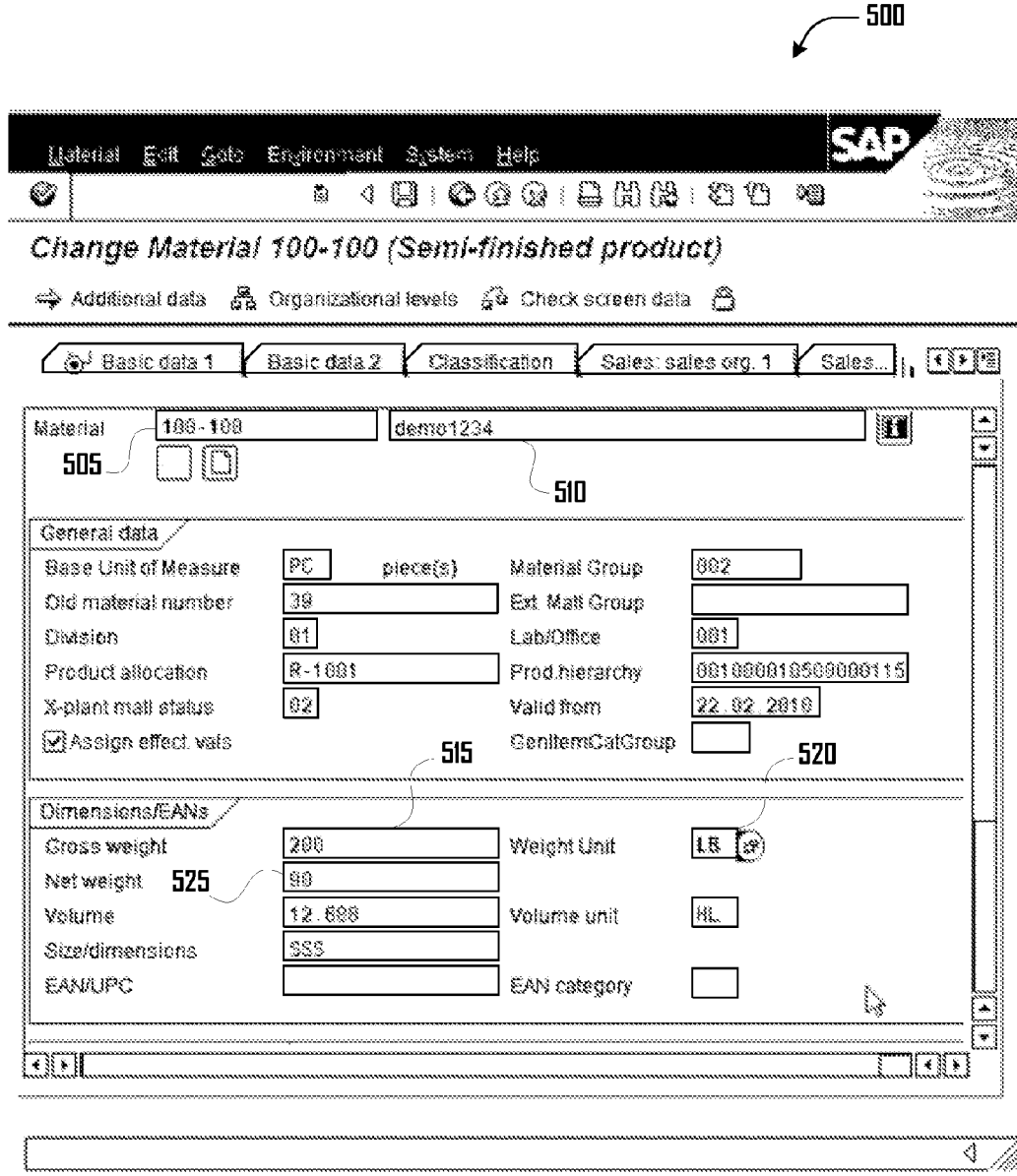
FIG. 5 illustrates an exemplary transaction in an ERP client process in accordance with one embodiment.

For example, as illustrated in FIG. 5, a user may in one embodiment define and perform a transaction using an SAP client, such as SAPgui 500. In the exemplary transaction illustrated in FIG. 5, the user is updating SAP data using a Material Number field 505, a Material Description field 510, a Gross Weight field 515, a Weight Unit field 520, and a Net Weight field 525. Although the exemplary transaction illustrated herein uses SAP's ERP system, in other embodiments, equivalent procedures may be used to implement equivalent functionality in other ERP systems.

Referring again to FIG. 4, once the transaction is defined, ERP client 402 performs the transaction, sending one or more transaction requests 410 to ERP Server 110 using a native API provided by the ERP Server 110. In response, ERP Server 110 returns 415 one or more transaction results (e.g., a list of updated fields, status message(s), log data, responsive data, and the like). For example, in one embodiment, ERP client 402 (e.g., SAPgui) communicates with ERP Server 110 (e.g., an SAP server) via one or more RFCs. In other embodiments, ERP Server 110 may expose a native API as a web service, in which case, ERP client 402 may communicate with ERP Server 110 via SOAP messages, XML messages/data, JSON data, or the like.

As the user defines 405 and performs 410 the transaction, DWS client 403 monitors the user's activities in ERP client 402 and/or monitors the ERP client's communications with ERP Server 110. Using data thereby collected, DWS client 403 records and maps 420 the transaction that was defined 405 and performed 410 in ERP client 402.

Figure 6:
FIG. 6 illustrates an exemplary transaction recorded in a DWS client in accordance with one embodiment.

For example, as illustrated in FIG. 6, in one embodiment, a DWS client such as transactionSHUTTLE 600, provided by Winshuttle, Inc. of Bothell, Wash. (the assignee of this application), may record and map the transaction. As illustrated in FIG. 6, transactionSHUTTLE 600 has recorded the exemplary transaction (as defined according to FIG. 5), and the user has mapped the Material Number field 605, the Material Description field 610, the Gross Weight field 615, the Weight Unit field 620, and the Net Weight field 625 to XML sources, indicating that when the recorded transaction is re-played at a later time, values for these fields will be provided by XML data. In other embodiments, one or more of the fields may be mapped to an alternate data source, such as a spreadsheet column or database field.

Referring again to FIG. 4, once the transaction is recorded and mapped 420, DWS client 403 sends a publish transaction request 425 to DWS Server 200. In response, DWS Server 200 creates a dynamic web service 430 for the recorded transaction, including automatically generating a description of the dynamic web service, and returns an identifier 435 for the created dynamic web service.

Figure 7:
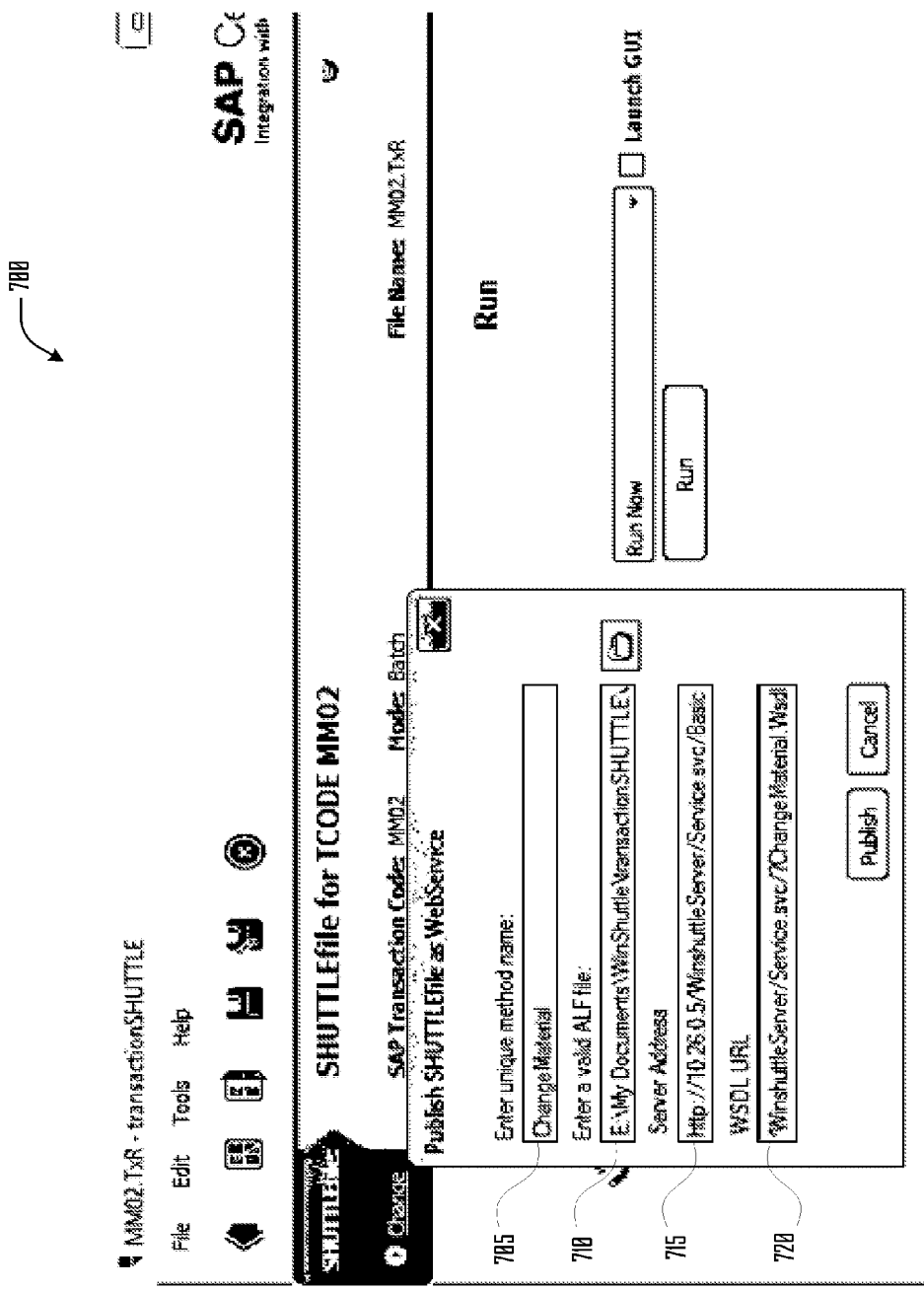
FIG. 7 illustrates an exemplary transaction published from a DWS client in accordance with one embodiment.

For example, as illustrated in FIG. 7, transactionSHUTTLE 700 has requested that the exemplary transaction (as defined according to FIG. 5) be published as a dynamic web service. The publication request includes a unique method name 705 for the dynamic web service, an SAP authentication file 710, and a publish-request URL 715 at the DWS Server 200. Also illustrated is the dynamic web service identifier 720 (here, an URL for a WSDL XML schema corresponding to the newly-created dynamic web service) that was returned by DWS Server 200.

FIG. 8 illustrates a portion of an automatically-generated description (here, a portion of a WSDL XML schema) corresponding to the exemplary transaction (as defined according to FIG. 5). The exemplary WSDL XML schema includes a unique method name 801 for the dynamic web service, as well as elements 830, 835 for running the recorded transaction and for receiving a response from the DWS Server 200. The illustrated element 830 for running the recorded transaction also includes a series of elements for providing input data to the recorded transaction, including a Material Number element 805, a Material Description element 810, a Gross Weight element 815, a Weight Unit element 820, and a Net Weight element 825.

Referring again to FIG. 4, once the transaction has been published as a dynamic web service, DWS client 403 provides the dynamic web service identifier 440 to a custom Transaction client 401, which uses the identifier to request a description of the identified dynamic web service 445 from DWS Server 200. DWS Server 200 returns the requested description 450. Using the received dynamic web service description, Transaction client 401 generates a custom interface 455 for providing input data for the recorded transaction.

Figure 9:
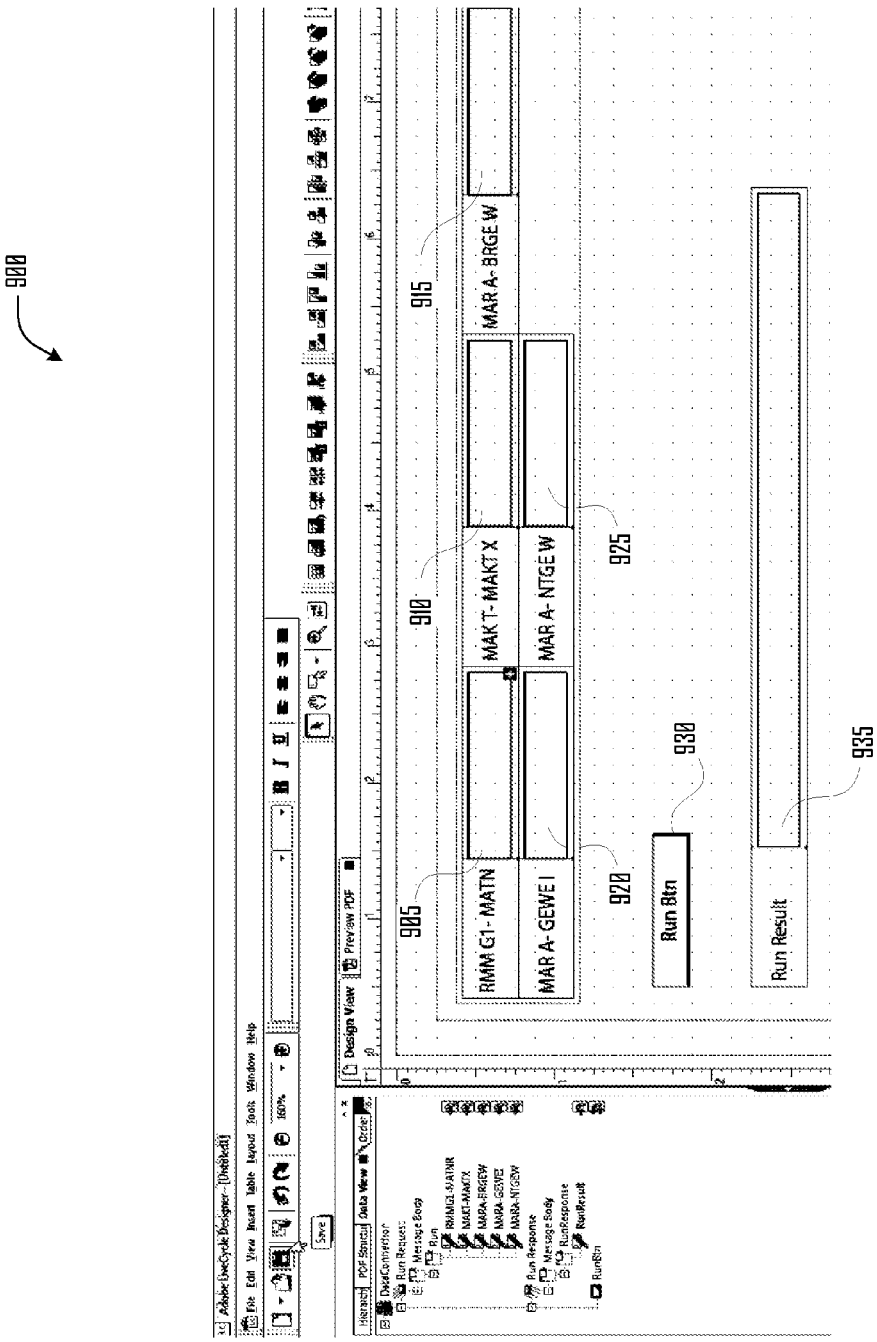
FIG. 9 illustrates a forms authoring tool automatically generating a form according to an exemplary dynamic web service description in accordance with one embodiment.

For example, as illustrated in FIG. 9, a forms-authoring tool such as LiveCycle Designer, provided by Adobe Systems Incorporated of Mountain View, Calif., can parse the WSDL XML schema describing the exemplary recorded transaction (as defined according to FIG. 5) and automatically generate a form having fields linked to the appropriate inputs used by the dynamic web service. For example, the form illustrated in FIG. 9 has automatically-generated fields for the Material Number field 905, the Material Description field 910, the Gross Weight field 915, the Weight Unit field 920, and the Net Weight field 925. The form illustrated in FIG. 9 also has an automatically-generated control 930 for performing the transaction and an automatically-generated field 935 for displaying output from performing the transaction (if any). In many embodiments, a user may further customize the automatically-generated form, such as by providing user-friendly names, rearranging and/or resizing form fields, and the like.

In other embodiments, other forms-authoring tools may be employed to at least partially automatically generate a form having fields linked to the appropriate inputs used by the dynamic web service. For example, in various embodiments, a form may be generated using a tool such as Microsoft InfoPath forms, provided by Microsoft Corporation of Redmond, Wash.; a Windows Forms application, such as Microsoft Visual Studio, also provided by Microsoft Corporation of Redmond, Wash.; a mobile forms builder, such as Canvas, provided by Canvas Solutions, Inc. of Herndon, Va.; and/or a web-form builder, such as Oracle Application Express (APEX), provided by Oracle Corporation of Redwood Shores, Calif.

Referring again to FIG. 4, once the custom Transaction client 401 has generated a custom interface for providing input data for the recorded transaction, Transaction client 401 obtains input data from a user 460 and sends a dynamic web service invocation 465 to DWS Server 200. DWS Server 200 identifies the recorded transaction corresponding to the dynamic web service invocation, transforms 470 the dynamic web service invocation into one or more transaction requests, and sends the one or more transaction requests 475 to ERP Server 110 via a native ERP API. ERP Server 110 returns transaction results 480 (if any) via the native ERP API, and DWS Server 200 sends the transaction results 485 (if any) to Transaction client 401.

Figure 10:
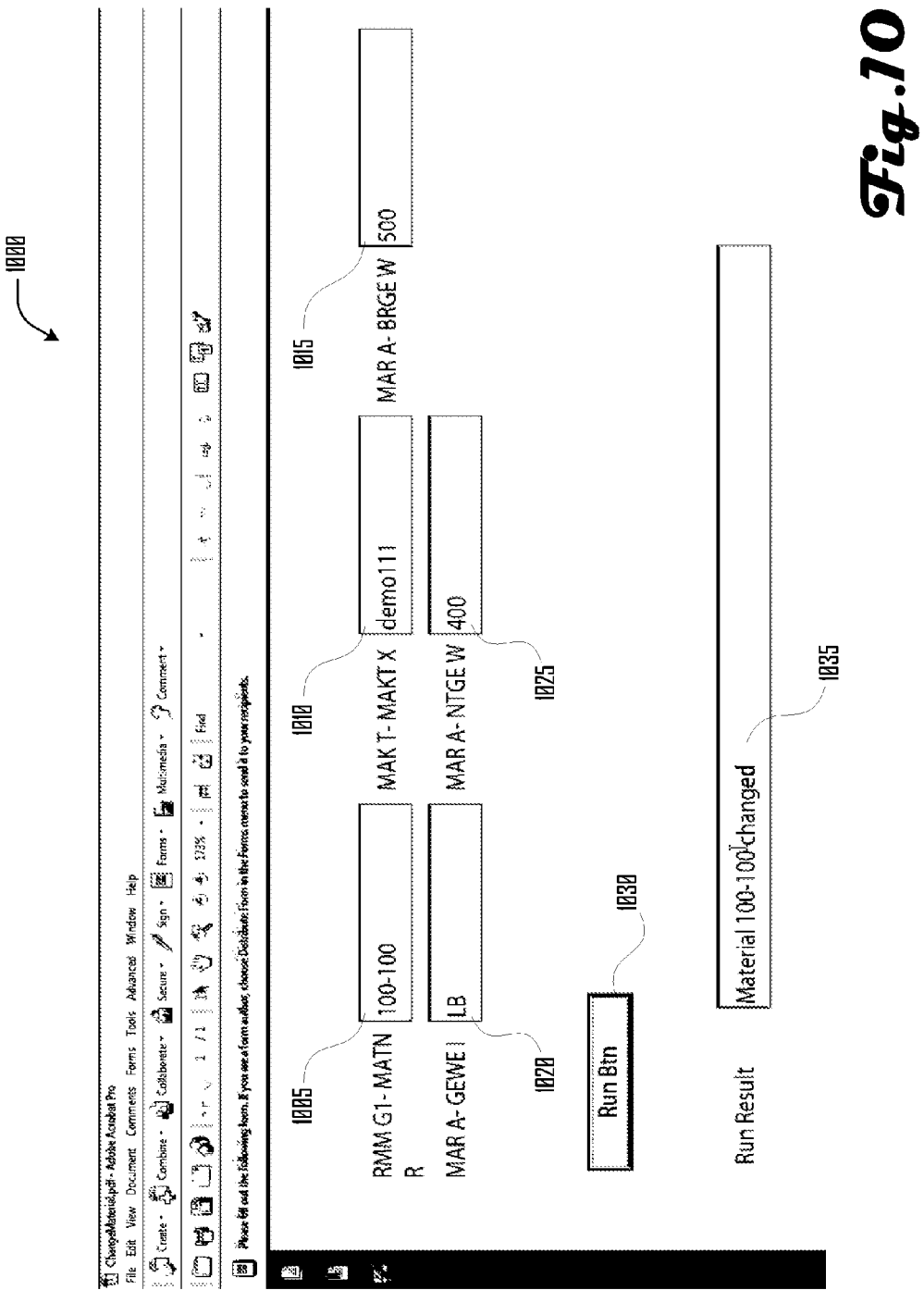
FIG. 10 illustrates a form presentation tool obtaining data in accordance with one embodiment.

For example, as illustrated in FIG. 10, a form presentation tool such as Acrobat Reader or Acrobat Pro, provided by Adobe Systems Incorporated of Mountain View, Calif., can obtain data from a user for fields in a form 1000 automatically-generated as described herein. For example, as illustrated in FIG. 10, a user has filled in the form 1000, entering values for the Material Number field 1005, the Material Description field 1010, the Gross Weight field 1015, the Weight Unit field 1020, and the Net Weight field 1025. The user has invoked control 1030 for performing the transaction, and the form invoked the corresponding dynamic web service, sending appropriately-formatted XML data to DWS Server 200, which transformed the dynamic web service request into one or more native-API transactions with ERP Server 110. Transaction results are displayed in field 1035.

Although the exemplary Transaction client 401 is illustrated as a Portable Document Format ("PDF") form, in other embodiments, any client that supports web services can be used, including Microsoft InfoPath forms, provided by Microsoft Corporation of Redmond, Wash.; a Windows Forms application, such as Microsoft Visual Studio, also provided by Microsoft Corporation of Redmond, Wash.; and/or a HyperText Markup Language, Adobe Flash, or other web-based front-end that can be called from a web-enabled computer or mobile device. In some embodiments, a Transaction client 401 may be deployed on a mobile device, such as a mobile phone, PDA, tablet, game console, or the like, which may or may not be the same device on which the transaction was originally recorded.

Figure 11:
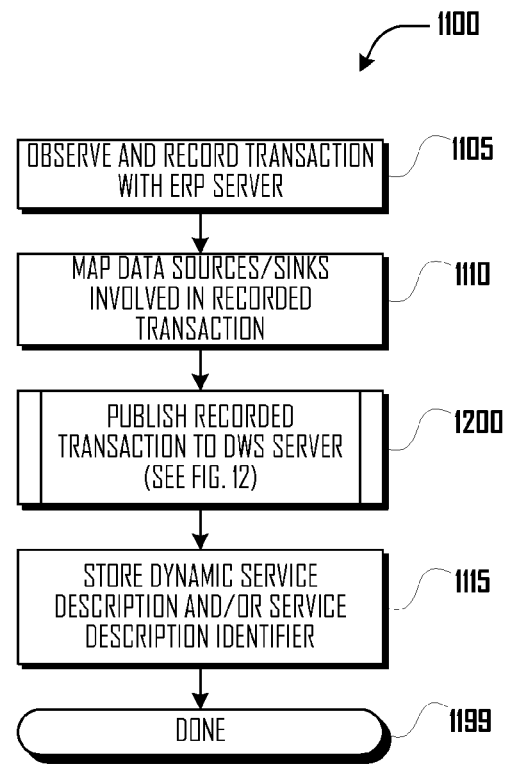
FIG. 11 illustrates a record-map-publish routine in accordance with one embodiment.

FIG. 11 illustrates a record-map-publish routine 1100 in accordance with one embodiment. In some embodiments, routine 1100 may be performed by Client 300 in communication with DWS Server 200. In block 1105, routine 1100 observes and records a native-ERP-API transaction between an ERP client 402 and ERP Server 110. For example, in one embodiment, a DWS client process 403 (e.g., transactionSHUTTLE) may observe and record a transaction between an ERP client 402 (e.g., SAPGui) and ERP Server 110 (e.g., SAP server), for example, via an SAP GUI scripting interface. In some embodiments, routine 1100 may also monitor network communications between an ERP client 402 and ERP Server 110.

In block 1110, routine 1100 maps data sources and/or data sinks (if any) involved in the recorded transaction. For example, in some embodiments, ERP Server 110 may return a list of fields involved in the transaction or other metadata about the transaction. In some embodiments, routine 1100 may observe the user interacting with particular fields in the ERP client process 402. In some embodiments, routine 1100 may solicit mapping information from a user, accepting user input to create mappings between particular input and/or output fields involved in the transaction and external data sources and/or data sinks (e.g., XML data, spreadsheet data, database data, and the like). In some embodiments, one or more of the fields involved in the transaction may not be mapped to an external source, but the data provided during the original transaction recording is treated as static data for that field.

In called-routine block 1200, routine 1100 calls a remote publish routine 1200 (see FIG. 12, discussed below) at DWS Server 200 to have the recorded and mapped transaction published as a dynamic web service. For example, in one embodiment, DWS Server 200 may provide a static "Publish" web service that routine 1100 can use to have the recorded/mapped transaction published as a dynamic web service.

In some embodiments, called-routine 1200 returns a dynamic service description and/or a dynamic service description identifier (e.g., a WSDL XML schema describing the dynamic web service and/or an URL for such a WSDL file), and in block 1115, routine 1100 stores (at least transiently) the dynamic service description and/or a dynamic service description identifier. Routine 1100 ends in block 1199.

Figure 12:
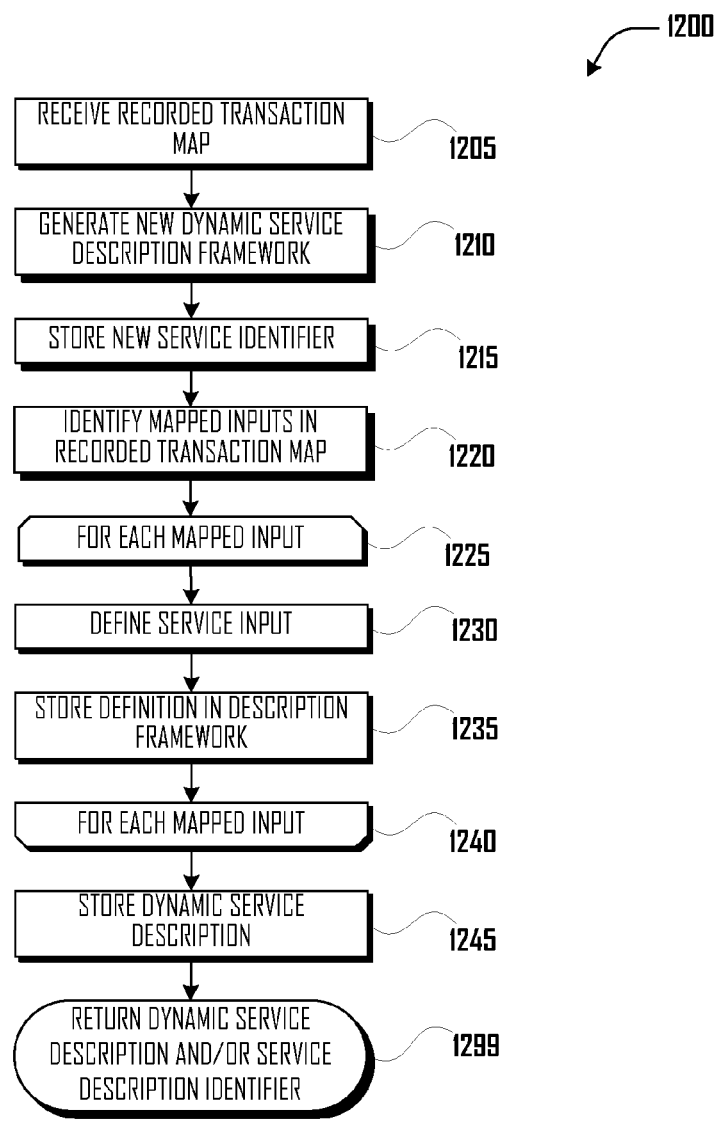
FIG. 12 illustrates a dynamic web service publish routine in accordance with one embodiment.

FIG. 12 illustrates a dynamic web service publish routine 1200. In some embodiments, routine 1200 may be performed by DWS Server 200. In block 1205, routine 1200 receives a recorded transaction map describing a recorded transaction between an ERP client 402 and ERP Server 110 and mapping one or more fields involved in the transaction to one or more external data sources (e.g., to XML data). For example, in one embodiment, routine 1200 receives a "TxR" file, such as those created by the transactionSHUTTLE software application.

Using the recorded transaction map, in block 1210, routine 1200 automatically generates a description framework for a new dynamic web service corresponding to the recorded transaction. For example, in one embodiment, routine 1200 generates a framework for a WSDL XML schema such as that partially illustrated in FIG. 8, discussed above. In some embodiments, routine 1200 may store the description framework in DWS data store 105. In block 1215, routine 1200 determines (if need be) and stores a new service identifier for the dynamic web service that will correspond to the recorded transaction map. In some embodiments, routine 1200 may store the service identifier in DWS data store 105. For example, for the exemplary transaction illustrated in FIGS. 5-8, discussed above, routine 1200 may store the unique dynamic web service identifier, "ChangeMaterial" (see field 705, above).

In block 1220, routine 1200 identifies one or more input fields that have been mapped to one or more external data sources. Beginning in block 1225, routine 1200 processes each identified mapped input field. In block 1230, routine 1200 defines an input for the dynamic web service corresponding to the current mapped input field. In block 1235, routine 1200 stores the defined input in the service description framework. In block 1240, routine 1200 cycles back to block 1225 to process the next mapped input field (if any).

For example, for the exemplary transaction illustrated in FIGS. 5-8, discussed above, routine 1200 may identify an input field mapped to a "Material Number" data source (e.g., field 605 in FIG. 6) and generate and store a corresponding input element in a WSDL XML schema (e.g., element 805 in FIG. 8). Similarly, for the exemplary transaction, routine 1200 may further identify mapped input fields 610-25 (as illustrated in FIG. 6) and generate elements 810-25 (as illustrated in FIG. 8).

Having generated and stored an identifier and description for a new dynamic web service corresponding to a recorded transaction map, in block 1245, routine 1200 stores completed dynamic web service description, for example, in DWS data store 105. In some embodiments, routine 1200 may also obtain and store additional data and/or files, such as ERP authentication credentials (see, e.g., FIG. 7 field 710).

Routine 1200 ends in bock 1299, making available at least one of the identifier and the description, e.g., to the calling routine (which may be a remote process on a client device, e.g., Client 300). For example, in one embodiment, routine 1200 may return an URL containing the unique dynamic web service identifier. In one embodiment, this URL simply returns the dynamic web service description stored in block 1245 (e.g., a WSDL XML Schema) to a requestor. For example, if the unique dynamic web service identifier is "CreateMaterial," then in one embodiment, the returned URL may take the following form: "http://abc.com/winshuttleserver/Service.svc/CreateMaterial?WSDL". Since the dynamic web service identifier is unique, this URL is also unique and specific to the published service.

Figure 13:
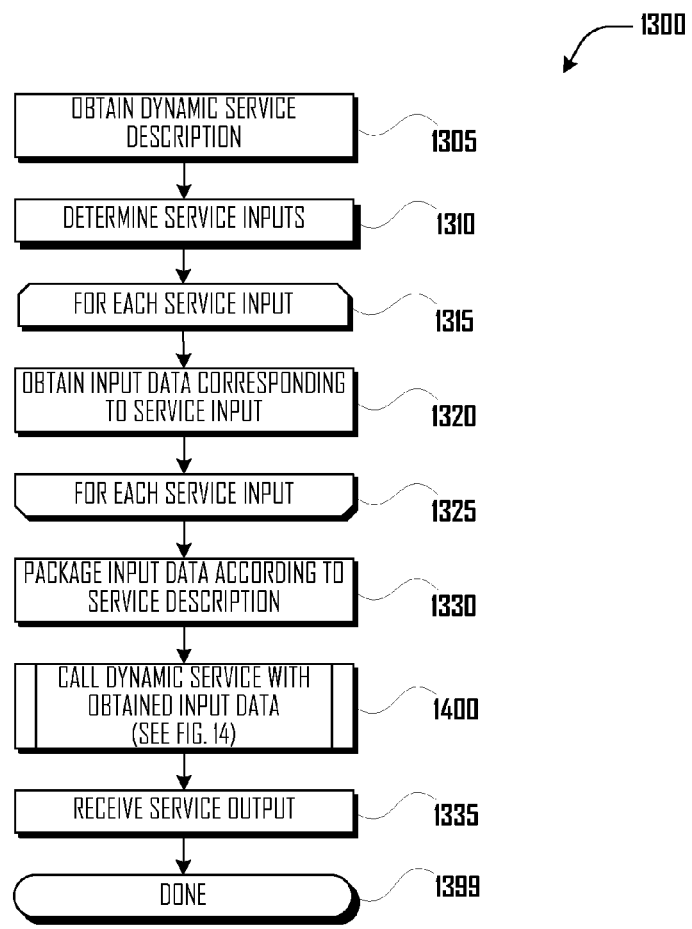
FIG. 13 illustrates a dynamic web service consumption routine in accordance with one embodiment.

FIG. 13 illustrates a dynamic web service consumption routine 1300 in accordance with one embodiment. In some embodiments, routine 1100 may be performed by Client 300 (more specifically, by a Transaction client process 401 on Client 300) in communication with DWS Server 200. In block 1305, routine 1300 obtains a description for a dynamic web service corresponding to a recorded transaction with ERP Server 110. For example, in some embodiments, routine 1300 may obtain an URL (e.g., from DWS client 403) from which routine 1300 requests and receives a service description. In other embodiments, routine 1300 may obtain such an URL and/or service description from a local process (e.g., DWS client 403) or file.

In block 1310, routine 1300 determines one or more service inputs mapped to one or more external data sources in the dynamic service description. Beginning in block 1315, routine 1300 processes each identified service input. In block 1320, routine 1300 obtains input data corresponding to the current service input. In block 1325, routine 1300 cycles back to block 1315 to process the next service input (if any).

For example, for the exemplary transaction illustrated in FIGS. 8-10, discussed above, routine 1300 may identify a service input mapped to a "Material Number" data source (e.g., element 805 in FIG. 8) obtain corresponding input from a user (e.g., via form field 1005 in FIG. 10). Similarly, for the exemplary transaction, routine 1300 may further identify service inputs 810-25 (as illustrated in FIG. 8) and obtain inputs via corresponding form fields 1010-25 (as illustrated in FIG. 10).

In block 1330, routine 1300 packages the obtained input data according to the obtained dynamic service description. For example, in one embodiment, routine 1300 packages the input data into XML according to the WSDL service description. In some embodiments, routine 1300 packages the input data into an XML SOAP message according to the WSDL service description.

In called-routine block 1400 (see FIG. 14, discussed below), routine 1300 passes the packaged data to the dynamic web service corresponding to the obtained dynamic web service description. In some embodiments, called-routine 1400 is a remote process that routine 1300 invokes on DWS Server 200 by calling a static "Run" web service, passing in as parameters a dynamic web service identifier and the corresponding packaged data.

In block 1335, routine 1300 receives output from the invoked dynamic web service (if any). For example, in some embodiments, the dynamic web service may return log information, and/or requested data structures. Routine 1300 ends in block 1399.

Figure 14:
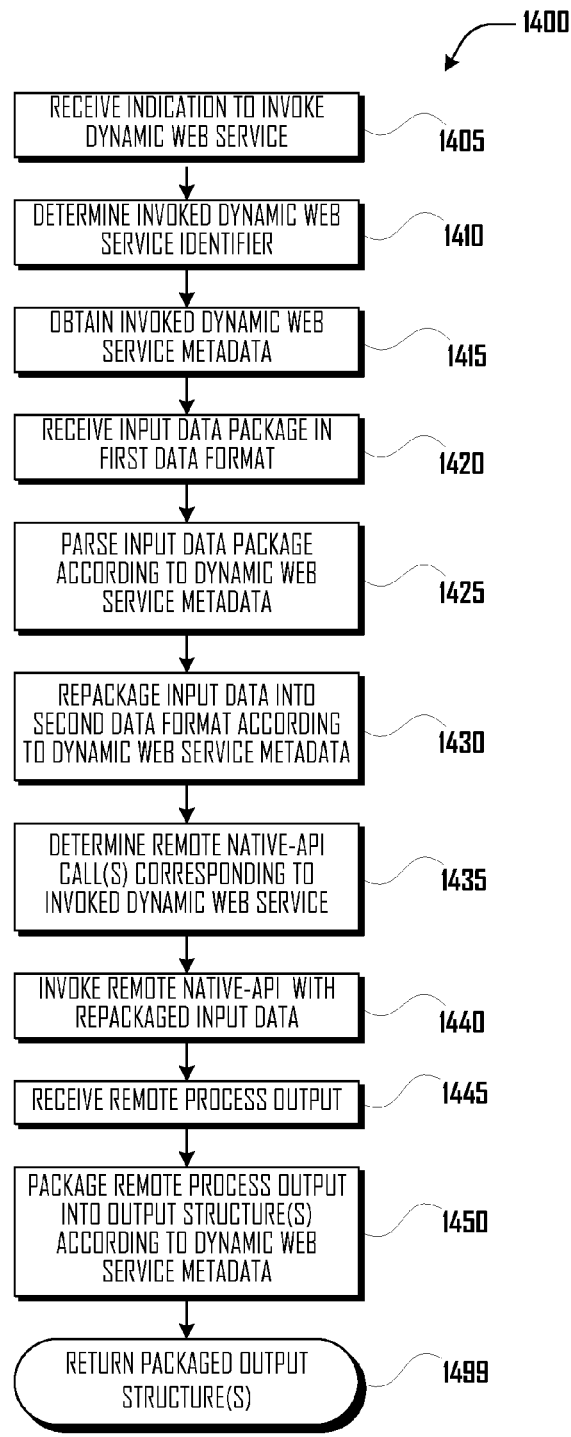
FIG. 14 illustrates a dynamic web service routine in accordance with one embodiment.

FIG. 14 illustrates a dynamic web service routine 1400 in accordance with one embodiment. In some embodiments, routine 1100 may be performed by DWS Server 200. In block 1405, routine 1400 receives an indication to invoke a dynamic web service. For example, in one embodiment, a static web service (e.g., a "Run" web service) may be invoked with an indication of a dynamic web service to perform.

In block 1410, routine 1400 determines an identifier corresponding to the indicated dynamic web service. For example, in one embodiment, routine 1400 may determine a dynamic web service identifier passed in as a parameter to a static web service.

In block 1415, routine 1400 obtains metadata corresponding to the identified dynamic web service. For example, in one embodiment, routine 1400 obtains metadata from a metadata library in DWS data store 105. In some embodiments, the obtained metadata includes information from a recorded transaction map. In some embodiments, the obtained metadata may also include ERP authentication credentials.

In block 1420, routine 1400 obtains a package of input data in a first data format. For example, in one embodiment, routine 1400 obtains XML and/or SOAP data corresponding to one or more input fields.

In block 1425, routine 1400 parses the input data package according to the obtained dynamic web service metadata, and if necessary, in block 1430, routine 1400 repackages the input data into a second data format according to the dynamic web service metadata. For example, in one embodiment, routine 1400 repackages XML and/or SOAP data structures into one or more packages of data structured so as to comply with an RFC calling mechanism used to communicate via a native-API with ERP Server 110.

In block 1435, using the obtained dynamic web service metadata, routine 1400 determines one or more remote native-ERP-API calls corresponding to the invoked dynamic web service. For example, in one embodiment, routine 1400 may determine one or more RFC calls that were recorded between an ERP client 402 and ERP Server 110.

In block 1440, routine 1400 invokes the one or more remote native-ERP-API calls on ERP Server 110, using the repackaged input data in place of the input data originally provided in the recorded transaction. In some embodiments, routine 1400 may essentially "mimic" the behavior of the ERP client 402 from which the transaction was originally recorded, using RFC to invoke the ERP Server's native-ERP-API. In other embodiments, routine 1400 may use a native-ERP web service API to perform the recorded transaction with the newly provided input data.

In block 1445, routine 1400 receives output data from the remotely-invoked native-ERP-API calls (if any). In block 1450, routine 1400 packages the output data into one or more output structures (if any) identified in the dynamic web service metadata. In block 1499, routine 1400 ends, making available the packaged output structures (if any), e.g., to the calling remote process.

Although specific embodiments have been illustrated and described herein, it will be appreciated by those of ordinary skill in the art that a whole variety of alternate and/or equivalent implementations may be substituted for the specific embodiments shown and described without departing from the scope of the present invention. For example, although the description above refers to embodiments involving enterprise resource planning systems, other embodiments may be similarly used in other types of enterprise application systems in which a transaction between an enterprise client and an enterprise server may be recorded and mapped, as variously described above. For example, the systems and methods described herein may be used in connection with enterprise systems such as customer relationship management ("CRM") systems, accounting systems, supply chain management systems, and the like. This application is intended to cover any adaptations or variations of the embodiments discussed herein.

The invention claimed is:

1. A dynamic-web-services-server-implemented method for publishing a dynamic web service, the method comprising:

receiving, by said dynamic-web-services server from a first enterprise-resource-planning client, a recorded transaction map describing a recorded transaction between said first enterprise-resource-planning client and an enterprise-resource-planning server, said recorded transaction map including metadata corresponding to a plurality of transaction fields;

generating, by said dynamic-web-services server, a service description framework for a new dynamic web service corresponding to said recorded transaction, including for each of said plurality of transaction fields, defining an input corresponding to the current transaction field and storing said defined input in said service description framework;

determining, by said dynamic-web-services server, a unique service identifier for invoking said new dynamic web service;

persisting, by said dynamic-web-services server, said unique service identifier, said service description framework, and said recorded transaction map in a data store;

receiving, by said dynamic-web-services server, a first request from a second enterprise-resource-planning client to invoke said new dynamic web service according to a package of input data, said first request indicating said unique service identifier, said package of input data being received in a first format according to a first calling mechanism;

retrieving, by said dynamic-web-services server, said recorded transaction map from said data store according to said unique service identifier;

according to said recorded transaction map, determining, by said dynamic-web-services server, at least one Enterprise Application API call for performing said recorded transaction, said at least one Enterprise Application API call requiring a second calling mechanism, different from said first calling mechanism;

repackaging, by said dynamic-web-services server, said package of input data in said first format into repackaged input data in a second format that complies with said second calling mechanism; and invoking, by said dynamic-web-services server, an Enterprise Application server to perform said recorded transaction according to said second calling mechanism, said at least one Enterprise Application API call, and said repackaged input data.

2. The method of claim 1, further comprising:

receiving a second request from said first enterprise-resource-planning client or said second enterprise-resource-planning client for said service description framework, said second request indicating said unique service identifier;

retrieving said service description framework from said data store according to said unique service identifier; and sending said service description framework to said first enterprise-resource-planning client or said second enterprise-resource-planning client.

3. The method of claim 1, further comprising:

receiving from said enterprise-resource-planning server process output data corresponding to the invocation of said enterprise-resource-planning server;

packaging said process output data according to said first calling mechanism into packaged process output data; and providing said packaged process output data to said first enterprise-resource-planning client or said second enterprise-resource-planning client.

4. The method of claim 1, wherein performing said recorded transaction according to said package of input data comprises invoking said at least one Enterprise Application API call according to said second calling mechanism and said repackaged input data.

5. The method of claim 1, wherein:

said first calling mechanism comprises Simple Object Access Protocol ("SOAP");

said first format comprises Extensible Markup Language ("XML"); and said second calling mechanism comprises a remote function call ("RFC").

6. The method of claim 1, wherein:

said first calling mechanism conforms to Representational State Transfer ("REST") constraints and uses HTTP methods; and said second calling mechanism comprises a remote function call ("RFC").

7. The method of claim 1, wherein causing said recorded transaction to be invoked comprises invoking an Enterprise Application server to perform said recorded transaction.

8. The method of claim 1, wherein said first request is received via a transaction client software process on said second enterprise-resource-planning client.

9. A computing apparatus for publishing a dynamic web service, the apparatus comprising a processor and a memory storing instructions that, when executed by the processor, configure the apparatus to:

receive, from a first enterprise-resource-planning client, a recorded transaction map describing a recorded transaction between said first enterprise-resource-planning client and an enterprise-resource-planning server, said recorded transaction map including metadata corresponding to a plurality of transaction fields;

generate a service description framework for a new dynamic web service corresponding to said recorded transaction, including for each of said plurality of transaction fields, defining an input corresponding to the current transaction field and storing said defined input in said service description framework;

determine a unique service identifier for invoking said new dynamic web service;

persist said unique service identifier, said service description framework, and said recorded transaction map in a data store;

receive a first request from a second enterprise-resource-planning client to invoke said new dynamic web service according to a package of input data, said first request indicating said unique service identifier, said package of input data being received in a first format according to a first call mechanism;

retrieve said recorded transaction map from said data store according to said unique service identifier;

according to said recorded transaction map, determine at least one Enterprise Application API call for performing said recorded transaction, said at least one Enterprise Application API call requiring a second call mechanism, different from said first call mechanism;

repackage said package of input data in said first format into repackaged input data in a second format that complies with said second call mechanism; and invoke an Enterprise Application server to perform causing said recorded transaction according to said second call mechanism, said at least one Enterprise Application API call, and said repackaged input data.

10. The apparatus of claim 9, wherein the memory stores further instructions that further configure the apparatus to:

receive a second request from said first enterprise-resource-planning client or said second enterprise-resource-planning client for said service description framework, said second request indicating said unique service identifier;

retrieve said service description framework from said data store according to said unique service identifier; and send said service description framework to said first enterprise-resource-planning client or said second enterprise-resource-planning client.

11. The apparatus of claim 9, wherein the memory stores further instructions that further configure the apparatus to:

receive from said enterprise-resource-planning server process output data corresponding to the invocation of said enterprise-resource-planning server;

package said process output data according to said first call mechanism into packaged process output data; and provide said packaged process output data to said first enterprise-resource-planning client or said second enterprise-resource-planning client.

12. The apparatus of claim 9, wherein perform said recorded transaction according to said package of input data comprises invoking said at least one Enterprise Application API call according to said second call mechanism and said repackaged input data.

13. The apparatus of claim 9, wherein:

said first call mechanism comprises Simple Object Access Protocol ("SOAP");

said first format comprises Extensible Markup Language ("XML"); and said second call mechanism comprises a remote function call ("RFC").

14. The apparatus of claim 9, wherein:
said first call mechanism conforms to Representational State Transfer ("REST") constraints and uses HTTP methods; and
said second call mechanism comprises a remote function call ("RFC").

15. The apparatus of claim 9, wherein causing said recorded transaction to be invoked comprises invoking an Enterprise Application server to perform said recorded transaction.

16. The apparatus of claim 9, wherein said first request is received via a transaction client software process on said second enterprise-resource-planning client.

17. A non-transient computer-readable storage medium having stored thereon instructions that, when executed by a processor, configure the processor to:
receive, from a first enterprise-resource-planning client, a recorded transaction map describing a recorded transaction between said first enterprise-resource-planning client and an enterprise-resource-planning server, said recorded transaction map including metadata corresponding to a plurality of transaction fields;
generate a service description framework for a new dynamic web service corresponding to said recorded transaction, including for each of said plurality of transaction fields, defining an input corresponding to the current transaction field and storing said defined input in said service description framework;
determine a unique service identifier for invoking said new dynamic web service;
persist said unique service identifier, said service description framework, and said recorded transaction map in a data store;
receive a first request from a second enterprise-resource-planning client to invoke said new dynamic web service according to a package of input data, said first request indicating said unique service identifier, said package of input data being received in a first format according to a first call mechanism;
retrieve said recorded transaction map from said data store according to said unique service identifier;
according to said recorded transaction map, determine at least one Enterprise Application API call for performing said recorded transaction, said at least one Enterprise Application API call requiring a second call mechanism, different from said first call mechanism;
repackage said package of input data in said first format into repackaged input data in a second format that complies with said second call mechanism; and
invoke an Enterprise Application server to perform said recorded transaction to be performed according to said second call mechanism, said at least one Enterprise Application API call, and said repackaged input data.

18. The storage medium of claim 17, having stored thereon further instructions that further configure the processor to:
receive a second request from said first enterprise-resource-planning client or said second enterprise-resource-planning client for said service description framework, said second request indicating said unique service identifier;
retrieve said service description framework from said data store according to said unique service identifier; and
send said service description framework to said first enterprise-resource-planning client or said second enterprise-resource-planning client.

19. The storage medium of claim 17, having stored thereon further instructions that further configure the processor to:
receive from said enterprise-resource-planning server process output data corresponding to the invocation of said enterprise-resource-planning server;
package said process output data according to said first call mechanism into packaged process output data; and
provide said packaged process output data to said first enterprise-resource-planning client or said second enterprise-resource-planning client.

20. The storage medium of claim 17, wherein perform said recorded transaction according to said package of input data comprises invoking said at least one Enterprise Application API call according to said second call mechanism and said repackaged input data.

21. The storage medium of claim 17, wherein:
said first call mechanism comprises Simple Object Access Protocol ("SOAP");
said first format comprises Extensible Markup Language ("XML"); and
said second call mechanism comprises a remote function call ("RFC").

22. The storage medium of claim 17, wherein:
said first call mechanism conforms to Representational State Transfer ("REST") constraints and uses HTTP methods; and
said second call mechanism comprises a remote function call ("RFC").

23. The storage medium of claim 17, wherein causing said recorded transaction to be performed comprises invoking an Enterprise Application server to perform said recorded transaction.

24. The storage medium of claim 17, wherein said first request is received via a transaction client software process on said second enterprise-resource-planning client.

* * * * *